July 27, 1965   B. K. SHEPPARD   3,196,717
PIPE GRIPPING MECHANISM FOR CASING TONGS
Filed July 29, 1963   3 Sheets-Sheet 1
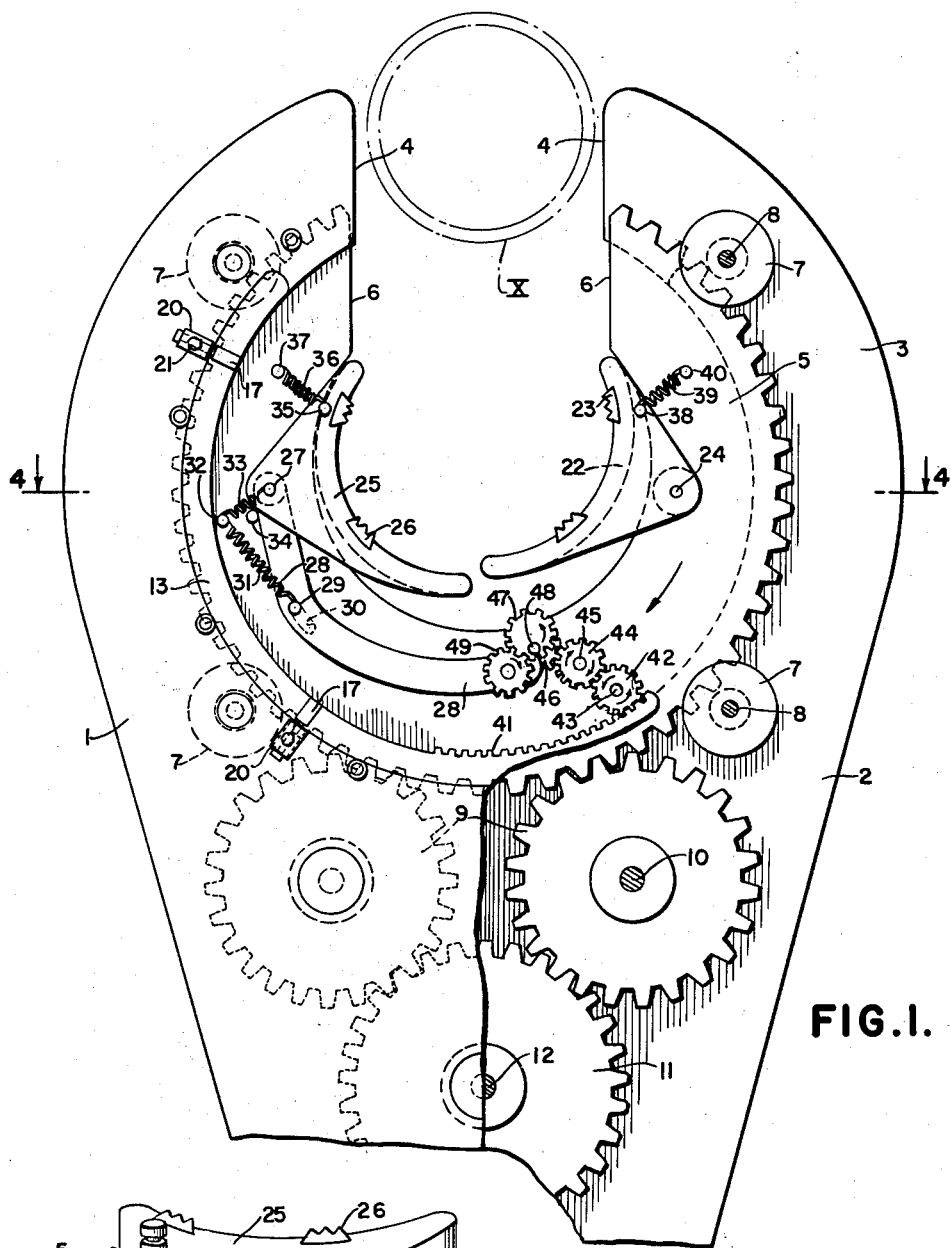
FIG. I.
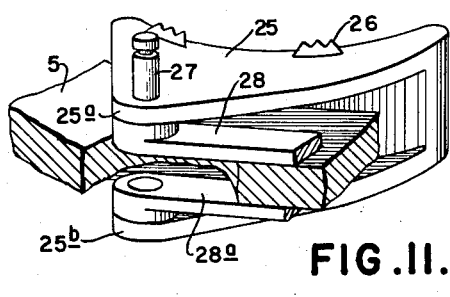
FIG. II.
INVENTOR
Billy K. Sheppard
BY *J. Hanson Boyden*
ATTORNEY July 27, 1965  B. K. SHEPPARD  3,196,717
PIPE GRIPPING MECHANISM FOR CASING TONGS
Filed July 29, 1963  3 Sheets-Sheet 2
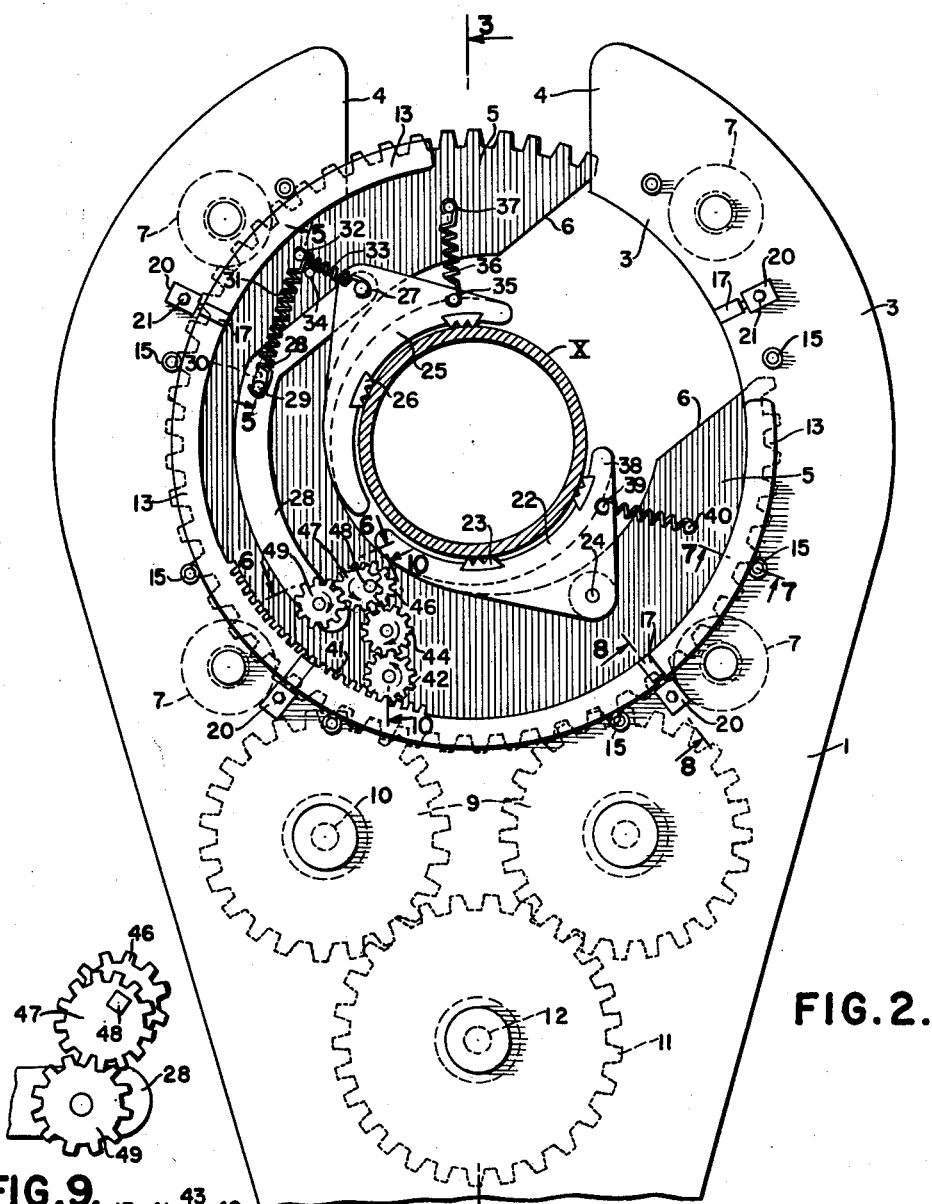
FIG. 2.
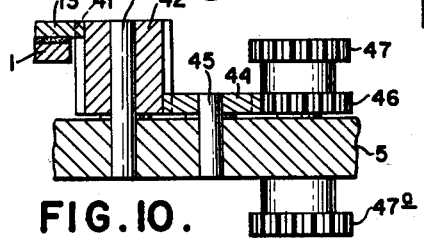
FIG. 9.
FIG. 10.
INVENTOR
Billy K. Sheppard
BY J. Hanson Boyden
ATTORNEY July 27, 1965  B. K. SHEPPARD  3,196,717
PIPE GRIPPING MECHANISM FOR CASING TONGS
Filed July 29, 1963  3 Sheets-Sheet 3
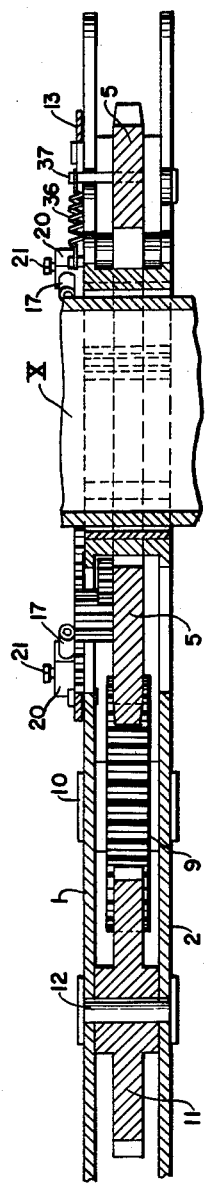
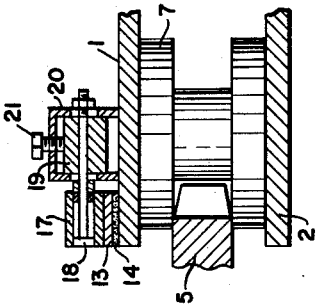
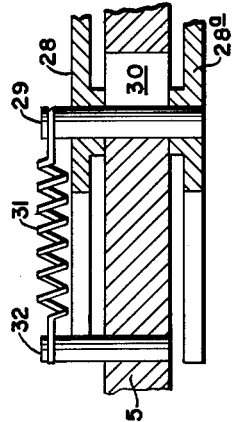
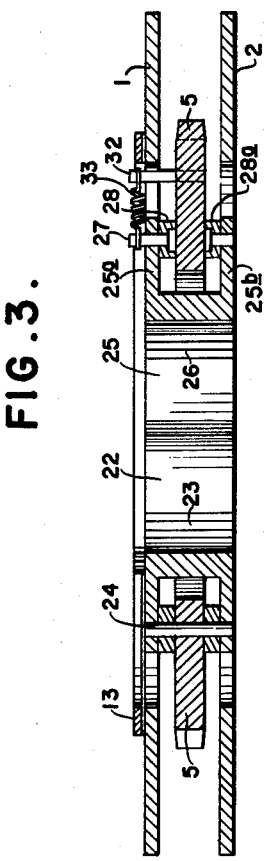
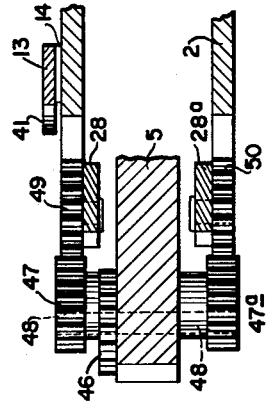
INVENTOR
Billy K. Sheppard
BY J. Hanson Boyden
ATTORNEY United States Patent Office 3,196,717
Patented July 27, 1965

3,196,717
PIPE GRIPPING MECHANISM FOR CASING TONGS
Billy K. Sheppard, Eastland, Tex.
(2190 Woodland Drive, Stephenville, Tex.)
Filed July 29, 1963, Ser. No. 298,041
8 Claims. (Cl. 81—57)

This invention relates to power tongs or wrenches for making and breaking threaded connections between pipe sections such as drill pipe, casing, tubing and the like, used in oil wells.

Power tongs of the type to which this invention relates comprise an elongated frame having at one end an annular structure, sometimes referred to as a "stator," and with in which revolves an annular member or "rotor," a pipe-gripping mechanism being carried by the rotor, and suitable power means for driving the rotor being mounted on the frame.

In order to permit lateral, horizontal application of such a power tongs to the vertical pipe, both the stator and rotor are provided with radial gaps or throats through which the pipe may be inserted into the interior of the rotor when these throats are brought into registry, by turning the rotor. The annular rotor having such a gap or throat may be referred to as a "partial ring."

Many tongs constructions have been heretofore proposed. In some of these constructions, cam means for gripping the pipe have been employed, such cam means acting against the inside of the partial ring. This exerts a pressure tending to spread the partial ring. As a consequence, it has been necessary to make the partial ring and stator excessively strong and heavy, to withstand the strain. This adds much weight to the tongs, making them difficult to operate and handle.

In other tongs constructions which are of relatively light weight, it has been proposed to use a manual latch for securing the tongs around the pipe. This, however, has its practical disadvantages and is troublesome to operate.

An object of the present invention is to devise a tongs construction of the general type above referred to in which there is no cam action exerted on the partial ring by the gripping mechanism, so that it is possible to make the ring and frame of much lighter weight.

Another object is to design a tongs in such a way that, although of relatively light weight, the necessity for the provision of manual latching means is obviated.

With the above and other objects in view, and to improve generally on the details of such apparatus, the invention consists in the construction, combination and arrangement of parts hereinafter described and claimed, and illustrated in the accompanying drawings, forming part of this specification, and in which:

FIG. 1 is a plan view of my improved tongs, shown with the throat open to receive the pipes, parts being broken away, and the power means being omitted;

FIG. 2 is a similar view, showing the parts in pipe-gripping position, and with the pipe in position at the center of the rotor or partial ring;

FIG. 3 is a vertical, longitudinal section on the line 3—3 of FIG. 2, looking in the direction of the arrows;

FIG. 4 is a vertical, transverse section on the line 4—4 of FIG. 1, looking in the direction of the arrows;

FIG. 5 is a fragmentary vertical section on an enlarged scale along the line 5—5 of FIG. 2, looking in the direction of the arrows;

FIG. 6 is a fragmentary vertical section on the same scale as FIG. 5, along the line 6—6;

FIG. 7 is a fragmentary vertical section, on substantially the same scale as FIGS. 3 and 4, along the line 7—7 of FIG. 2, looking in the direction of the arrows;

FIG. 8 is a fragmentary vertical section, on an enlarged scale, along the line 8—8 of FIG. 2, looking in the direction of the arrows;

FIG. 9 is a fragmentary plan view on an enlarged scale of the cam gear and two of the associated gears which operate the pipe-gripping mechanism;

FIG. 10 is a fragmentary vertical section on an enlarged scale along the line 10—10 of FIG. 1, looking in the direction of the arrows; and FIG. 11 is a fragmentary perspective view, looking from the left of FIG. 1, showing the manner in which the jaw is mounted on the jaw-carrying member.

Referring to the drawings in detail, my improved tongs comprise an elongated frame composed of top and bottom members 1 and 2 spaced apart in parallel relation by means hereafter described. The end portion 3 of this frame is of annular form and is provided with a gap or throat 4 through which the pipe may be inserted. Rotatably mounted between the upper and lower members of the frame is a partial ring 5, sometimes referred to as a rotor. This partial ring also has a gap or throat 6 which may be brought into registry with the throat 4, as shown in FIG. 1, so as to permit a pipe to pass through these two throats into the center of the partial ring.

This partial ring has gear teeth on its periphery and is supported by a plurality of flanged rollers 7 journalled on pins 8. These pins pass through the upper and lower members of the frame and serve to hold them together. The rollers are best illustrated in FIG. 8.

Meshing with the teeth on the periphery of the partial ring are a pair of gears 9 mounted on pins or shafts 10 and driven by another gear 11 mounted on a shaft 12.

The gears 9 also mesh with the teeth on the partial ring, and when they are rotated by means of the gear 11, they serve to drive or rotate the partial ring in the rollers 7. It will be noted that two gears 9, spaced somewhat apart laterally, are employed. This is for the purpose of enabling them to bridge the gap 6 in the partial ring 5 so that one or the other of them will be constantly in mesh with the teeth on the partial ring.

Supported on the upper member 1 of the frame is a braking element 13 which I will call a partial drag ring. As clearly shown in FIG. 1, this drag ring is of the same diameter as the annular part of the frame and the partial ring and is mounted concentric with this annular portion and the partial ring.

The partial drag ring 13 has a friction element 14 in the nature of a brake lining interposed between itself and the surface of the frame 1, as clearly shown in FIGS. 6, 7 and 8. The partial drag ring is held in position by means of a series of rollers 15 journalled on pins 16 which are carried by the frame member 1. The outer periphery of the drag ring bears against these rollers, as clearly shown in FIG. 7.

Means are provided for adjusting the amount of friction between the lining 14 and the surface of the frame 1 so that resistance to turning of the brake element 13 may be varied as desired. This means for adjusting the amount of friction is best shown in FIG. 8 and comprises a series of rollers 17 which bear upon the top of the brake element 13. These rollers are mounted on shafts 18 which extend through and are supported by blocks 19 mounted in housings 20 secured to the frame member 1. An adjusting screw 21 passes through the top of each housing 20 and bears upon the block 19, so that by turning this screw the pressure exerted on the block 19, and consequently on the roller 17, may be varied. Slots are provided in the sides of the housing 20 so as to permit the shaft 18 to move up and down as the screw 21 is turned. By this means, the pressure exerted on the brake element 13, and consequently its frictional resistance, can be adjusted as desired.

Supported by the partial ring 5 are a pair of pipe gripping jaws 22 and 25 having on their inner surface suitable dies 23 and 26, respectively. The jaw 22 is pivotally mounted directly on the partial ring 5 by means of a pin 24, while the opposite jaw 25 is mounted by means of a pin 27 on a jaw-carrying arm mounted on the partial ring.

This arm is made up of an upper member 28 and a lower member 28a, as shown in FIGS. 6 and 11. The jaws 22 and 25 are similar in construction and a description of one will suffice for both. Referring to FIG. 11, the jaw 25 has a pipe-engaging face and a pair of parallel, horizontally disposed wings 25a and 25b. The wing 25a is pivotally connected by means of a pin 27 with the upper member 28 of the jaw-supporting arm, while the lower wing 25b is pivotally connected to the lower member 28a of this arm.

The arm comprising the members 28 and 28a carries a pin 29 at a point intermediate its ends, which pin works freely through a slot 30 in the partial ring 5, as clearly shown in FIG. 5. A spring 31 connects the pin 29 with another pin 32 set into the partial ring 5, and a second spring 33 connects the pin 32 with the pivot pin 27.

A stop pin 34 is carried by the partial ring 5 at a point adjacent the spring 33 and serves as a stop to limit the swinging movement of the jaw-supporting arm when the direction of rotation of the partial ring is reversed to release the jaws.

A third spring 36 extends between a pin 37 carried by the partial ring 5 and a pin 35 carried by the jaw 25, the purpose of this spring being to pull the jaw back out of the way so that a pipe can be inserted through the gap or throat 6.

A similar spring 39 extends between a pin 38 carried by the jaw 22 and a pin 40 carried by the partial ring.

Along a portion of its inner periphery the partial drag ring 13 is formed with a toothed rack 41, and meshing with this rack is a gear 42 rotatable on a shaft 43 carried by the partial ring 5. A second gear 44 meshing with gear 42 turns freely on a shaft 45 also carried by the partial ring 5. This gear 44 meshes with a gear 46 secured to a shaft 48 which is journalled in the partial ring 5, as clearly shown in FIG. 6. To the upper and lower ends of this shaft 48 are secured a pair of similar gears 47 and 47a, both of which are eccentrically mounted on the shaft 48, as best shown in FIG. 9. The upper one of these gears meshes with a gear 49 carried by the upper member 28 of the jaw-supporting arm and the lower one meshes with a similar gear 50 mounted on the lower member 28a of the jaw-carrying arm. The spring 33 serves to keep gears 49 and 50 in mesh with the cam gears 47 and 47a.

It will thus be seen that, when the eccentric or cam gears 47 and 47a are rotated, they will tend to swing the jaw-supporting arm from the position shown in FIG. 1, in which the low portion of the cam gears is in mesh with the gears 49 and 50, to that shown in FIG. 2, in which the higher portion of the cam gears is in mesh with the gears 49 and 50. This action serves to swing the jaw 25 into biting engagement with the pipe X, as shown in FIG. 2, the jaw-carrying arm pivoting around the pin 29.

In operation, the tongs are brought into engagement with the pipe by a horizontal movement, the pipe passing through the registering throats 4 and 6, as shown in FIG. 1, into a position at the center of the partial ring where it can be gripped by the jaws 22 and 25. When the pipe is in position, the gear 11 is driven by suitable power means (not shown) and, through the gears 9, rotates the partial ring 5, the drag ring 13 being held stationary by the friction between it and the surface of the frame 1. The first effect of the rotation of the partial ring is to cause the gear 42 to be turned by the rack 41, since this rack is stationary. The gear 42 then turns the gears 44 and 46, and with them the cam gears 47 and 47a, so as to swing the arm 28, 28a about its pivot 29 and bring the jaw 25 into biting engagement with the pipe. As the partial ring continues to turn, the cam gears force the jaw 25 tighter and tighter against the pipe until the point is reached where the drag ring begins to slip on the frame. When this happens, the drag ring is then driven by the gear 42, which has become locked, and turns with the partial ring as the latter rotates to screw the pipe sections together.

It will be noted that during this operation the force with which the jaw 25 is applied to the pipe is held constant and definitely limited by the braking power or frictional slippage of the drag ring 13 on the frame.

As the torque increases toward the end of the pipe screwing operation, the pin 29, carried by the arm 28, 28a tends to move downward in the slot 30, thus forcing gears 49 and 50 still further against the high side of the cam gears, producing a kind of wedging action which increases the bite of the jaw 25 on the pipe in order to provide the necessary force to complete the makeup of the joint.

It will be noted that the slot 30 is of arcuate shape, concentric with the center of the partial ring 5. Therefore, when the force exerted against the arm 28, 28a, causes the pin 29 to move along the slot toward the lower end thereof, the jaw 25 will remain at a constant distance from the center of the partial ring, thus holding the pipe in alignment, and preventing any wobble. The movement of the pin 29 in the slot 30, and the corresponding movement of the arm 28, 28a, causes the gear 49 to push further against cam gear 47, thus producing a wedging action on the arm which keeps the jaw 25 from slipping on the pipe. In this way, a controlled amount of pressure is applied to the pipe, which is in proportion to the torque applied to turn the partial ring 5.

And in this connection it will be observed that my improved construction is designed to increase the mechanical advantage in transmitting force from the drag ring to the jaw 25. Thus, for example, if the gear 46 is made larger, and has, say, twice as many teeth as the gear 42, the force exerted on the jaw would be twice as great as that supplied by the drag ring. Furthermore, the arm 28, 28a constitutes a lever with unequal arms, the force being applied to the longer arm, and the shorter arm acting on the jaw. Thus, the biting force is greatly further increased.

Finally, it will be additionally noted that the point of strain on the partial ring, namely the point where the wedging action of the cam gear 47 takes place, is located, as shown in FIG. 1, substantially opposite the center of the throat of the partial ring 5. This, to a large extent, prevents the partial ring from being subjected to any strain which would tend to spread it, and thus makes possible the use of a much lighter partial ring and tong frame.

After the joining operation is completed, the direction of rotation of the partial ring 5 is reversed, thus bringing the parts back to the position shown in FIG. 1, ready for another cycle, the stop pin 34 serving to limit the movement of the arm 28 and the friction of the drag ring being sufficient to cause the cam gears to turn back into their original position.

What I claim is:

1. A pipe tongs comprising, in combination, an annular frame provided with a radial throat for the reception of a pipe, a partial ring rotatably mounted in said frame and having a side opening therein which may be brought into registry with said throat so that a pipe may be inserted laterally into said ring and disposed at the center thereof, means for rotating said ring about its central axis, a first pipe-gripping jaw pivotally mounted on said ring, an elongated rigid member pivotally mounted on said ring at a point between its ends, a second-pipe-gripping jaw pivotally carried by one end of said member in a position opposite said first jaw, a brake element frictionally engaging said frame, and means connecting said partial ring and brake element with the other end of said second jaw-carrying member in such manner that rotation of said ring serves through said brake element to move said second jaw into biting engagement with the pipe.

2. A pipe tongs in accordance with claim 1 in which said brake element is provided with an arcuate rack, and in which the means connecting the brake element and jaw-carrying member comprises a plurality of toothed gears meshing with each other, one of said gears also meshing with said rack, and another of said gears mounted on said jaw-carrying member.

3. A pipe tongs in accordance with claim 2 in which the second jaw-carrying member is in the form of an elongated arm pivotally connected intermediate its ends with said partial ring, the second jaw being carried by this arm near one end theerof and the said gear near the other, and in which the gear which meshes with the arm-carried gear is eccentrically mounted, so that, when rotated, it exerts a cam action tending to swing said arm on its pivot and move the jaw into biting engagement with the pipe.

4. A pipe tongs in accordance with claim 3 in which the pivot pin of the jaw- and gear-carrying arm is not fixed to the partial ring, but works through a slot extending in a direction lengthwise of the arm, whereby the arm is free to move longitudinally within the limits of said slot, so as to vary the distance between the gear which it carries and the axis of said cam gear.

5. A pipe tongs in accordance with claim 4 in which said slot is arcuate and is concentric with the axis of said partial ring.

6. A pipe tongs in accordance with claim 1 in which the brake element is in the form of a partial drag ring mounted concentrically with and supported on said annular frame, and lying on both sides of the center thereof and friction means interposed between the under side of said drag ring and the upper surface of said frame.

7. A pipe tongs in accordance with claim 1 in which the brake element is in the form of a partial drag ring mounted concentrically with and supported on said annular frame, in which said drag ring is of substantially the same diameter as said partial ring and has a toothed rack formed on the inner edge thereof, and in which a group of intermeshing gears is carried by said partial ring, one of which also meshes with said rack.

8. A pipe tongs comprising, in combination, an annular frame provided with a radial throat for the reception of a pipe, a partial ring rotatably mounted in said frame and having a side opening therein which may be brought into registry with said throat so that a pipe may be inserted laterally into said ring and disposed at the center thereof, means for rotating said ring about its central axis, a first pipe-gripping jaw pivotally mounted on said ring, a second pipe-gripping jaw, means operated by the rotation of said partial ring for bringing said second jaw into biting engagement with the pipe, and means including a brake element having a frictional drag on said frame for definitely limiting the force with which said jaw engages the pipe.

References Cited by the Examiner
UNITED STATES PATENTS

| | | | |
|---|---|---|---|
| 1,811,666 | 6/31 | Foster | 81—57 |
| 2,305,624 | 12/42 | Lange et al. | 81—57 |
| 2,618,468 | 11/52 | Lundeen | 81—57 |
| 2,703,221 | 3/55 | Gardner | 81—57 |
| 2,933,961 | 4/60 | Adams | 81—57 X |
| 2,989,880 | 6/61 | Hesser et al. | |
| 3,141,362 | 7/64 | Tamny et al. | 81—57 |
| 3,147,652 | 9/64 | George | 81—57 |

WILLIAM FELDMAN, *Primary Examiner.*